United States Patent
Nishimura

(10) Patent No.: US 10,858,039 B2
(45) Date of Patent: Dec. 8, 2020

(54) STEERING CONTROL UNIT

(71) Applicant: JTEKT CORPORATION, Osaka (JP)

(72) Inventor: Akihiko Nishimura, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 169 days.

(21) Appl. No.: 16/046,361

(22) Filed: Jul. 26, 2018

(65) Prior Publication Data

US 2019/0039640 A1 Feb. 7, 2019

(30) Foreign Application Priority Data

Aug. 4, 2017 (JP) ................. 2017-151798

(51) Int. Cl.
*B62D 5/04* (2006.01)
*B62D 6/10* (2006.01)
*B62D 6/06* (2006.01)

(52) U.S. Cl.
CPC ............. *B62D 5/0463* (2013.01); *B62D 6/06* (2013.01); *B62D 6/10* (2013.01)

(58) Field of Classification Search
CPC ........... B62D 5/0463; B62D 6/06; B62D 6/10
See application file for complete search history.

(56) References Cited

U.S. PATENT DOCUMENTS

| 4,926,960 | A | * | 5/1990 | Ishikura | ............... | B62D 5/0463 180/446 |
| 4,964,481 | A | | 10/1990 | Sano et al. | | |
| 2002/0005314 | A1 | | 1/2002 | Takehara et al. | | |

| 2006/0108154 | A1 | * | 5/2006 | MacK | ................... | B60W 40/13 177/136 |
| 2015/0375563 | A1 | * | 12/2015 | Takahashi | ........... | B60B 27/0068 384/448 |
| 2016/0347357 | A1 | * | 12/2016 | Kitazume | ................. | B62D 6/00 |
| 2020/0180678 | A1 | * | 6/2020 | Watanabe | ............. | B62D 5/0424 |

FOREIGN PATENT DOCUMENTS

| CN | 102 069 845 B | | 4/2014 |
| JP | H11-321685 A | | 11/1999 |
| JP | 2009-133680 A | | 6/2009 |
| JP | 2015-000674 A | | 1/2015 |
| JP | 2015000674 A | * | 1/2015 |

OTHER PUBLICATIONS

Jan. 7, 2019 Extended Search Report issued in European Patent Application No. 18186263.2.

* cited by examiner

*Primary Examiner* — Aaron L Troost
(74) *Attorney, Agent, or Firm* — Oliff PLC

(57) ABSTRACT

A steering control unit includes a microcomputer that controls the driving of a motor on the basis of a steering torque to cause the motor to produce an assist force that is supplied to a steering mechanism as power to steer front wheels. The microcomputer calculates, on the basis of the steering torque, an assist component indicative of the assist force that the motor needs to produce. The microcomputer obtains vertical forces related to the front wheels that are calculated by hub units that rotatably support the front wheels and have front wheel sensors for detecting forces applied to the front wheels. The microcomputer compensates the assist component by using the obtained vertical forces, to reduce a change in load on a driver that is caused when vertical loads on the front wheels change.

10 Claims, 6 Drawing Sheets

STEERING CONTROL UNIT

INCORPORATION BY REFERENCE

The disclosure of Japanese Patent Application No. 2017-151798 filed on Aug. 4, 2017 including the specification, drawings and abstract, is incorporated herein by reference in its entirety.

BACKGROUND OF THE INVENTION

1. Field of the Invention

The invention relates to a steering control unit.

2. Description of Related Art

Japanese Patent Application Publication No. 2015-000674 (JP 2015-000674 A) discloses an electric power steering system that supplies a steering mechanism of a vehicle with the torque of a motor as an assist force. In such an electric power steering system, a steering control unit needs to obtain various kinds of information related to traveling of a vehicle in order to control driving of a motor. According to JP 2015-000674 A, a number of occupied seats that represents the number of persons who are seated in a driver seat or in a passenger seat of a vehicle is determined on the basis of results detected by seat sensors mounted on the vehicle.

According to JP 2015-000674 A, the driving of the motor is controlled such that as the number of occupied seats determined on the basis of the results detected by the seat sensors increases, the motor supplies more assist force. This feature is intended to reduce an increase in load on a driver that is caused by an increase in the weight of a vehicle.

However, the weight of a vehicle changes depending on not only the number of occupied seats, i.e., the number of persons who are seated in a driver seat or in a passenger seat, but also the individual weight of each person and the weight of baggage in the vehicle. This may cause a change in load on a driver, such as making a driver feel that it is heavy or light to perform a steering operation, even when the number of occupied seats is unchanged. Further, a load shift that occurs in a vehicle due to acceleration or deceleration of the vehicle may cause a change in load on a driver, even when the number of occupied seats is unchanged. In order to provide a driver with a good steering feel, it is necessary to reduce the change in load on a driver. There is still room for improvement in this regard.

SUMMARY OF THE INVENTION

A purpose of the invention is to provide a steering control unit for reducing a change in load on a driver.

An aspect of the invention provides a steering control unit including a control unit that controls the driving of a motor on a basis of an operation state quantity that changes in response to a steering operation that a driver performs to operate a steering mechanism of a vehicle. The motor is a source of an assist force supplied to the steering mechanism. The control unit calculates, on the basis of the operation state quantity, an assist component indicative of the assist force that the motor needs to produce. The control unit obtains a vertical force that is information about a vertical load on a steered wheel of the vehicle. The vertical load is obtained by a bearing device that rotatably supports the steered wheel and that has a sensor for detecting a force applied to the steered wheel. The control unit compensates the assist component by using the obtained vertical force, to reduce a change in load on the driver that is caused when the vertical load on the steered wheel changes.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
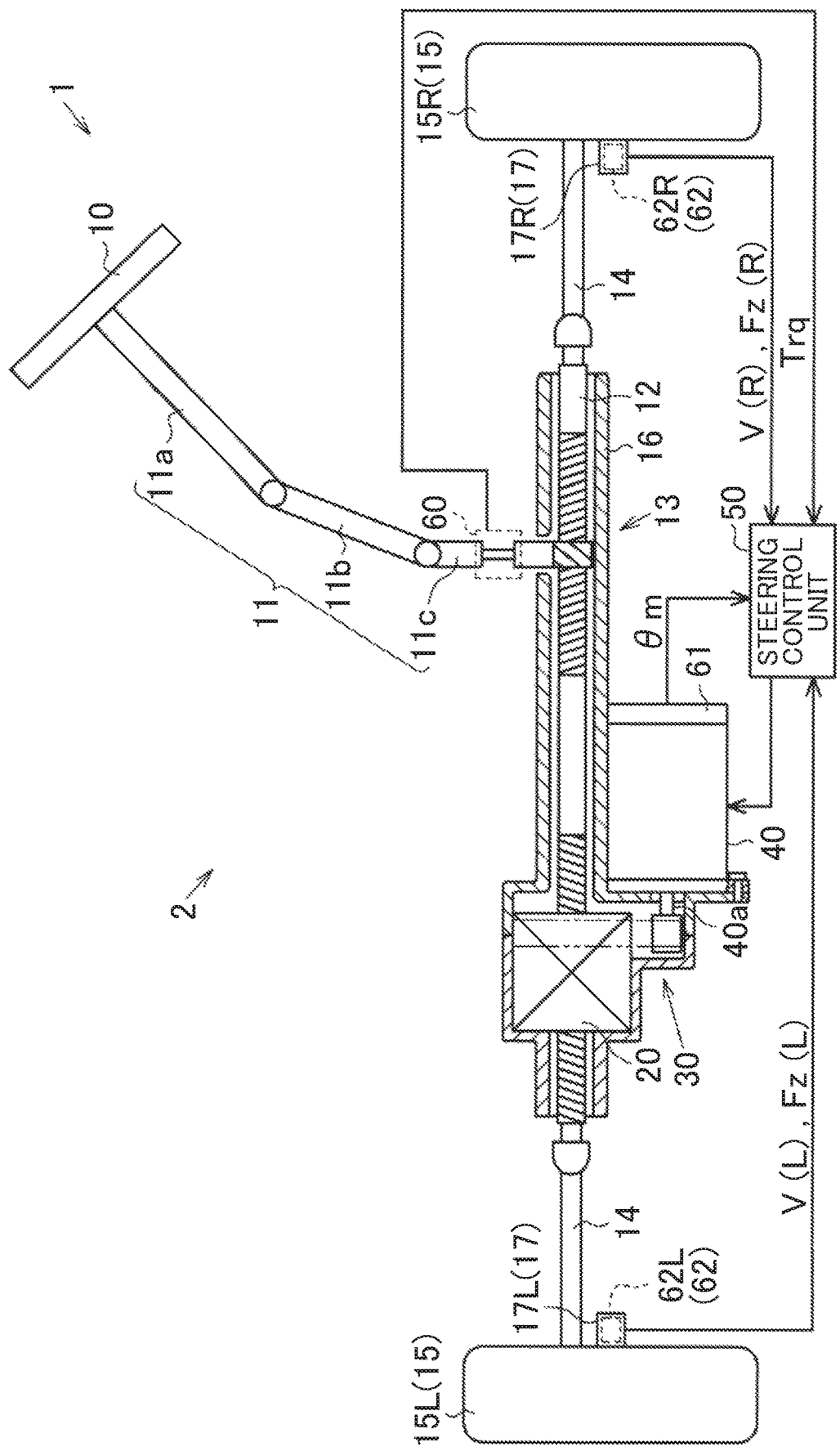
FIG. 1 is a diagram schematically illustrating an electric power steering system to be mounted on a vehicle.

A steering control unit according to a first embodiment is described below. As illustrated in FIG. 1, an electric power steering system 1 includes a steering mechanism 2 and a steering assist mechanism. The steering mechanism 2 steers a pair of right and left front steered wheels 15 (a right front wheel 15R illustrated on the right side of FIG. 1 and a left front wheel 15L illustrated on the left side of FIG. 1) in response to a steering operation that a driver performs to operate a steering wheel 10. The steering assist mechanism assists a driver to perform the steering operation.

The steering mechanism 2 includes the steering wheel 10 and a steering shaft 11. The steering shaft 11 is fixed to the steering wheel 10. The steering shaft 11 includes a column shaft 11a, an intermediate shaft 11b, and a pinion shaft 11c. The column shaft 11a is coupled to the steering wheel 10. The intermediate shaft 11b is coupled to the lower end of the column shaft 11a. The pinion shaft 11c is coupled to the lower end of the intermediate shaft 11b. The lower end of the pinion shaft 11c is coupled, via a rack and pinion mechanism 13, to a rack shaft 12 that serves as a steered shaft. The rack shaft 12 is supported by a rack housing 16. The front wheels 15R and 15L are coupled to different ends of the rack shaft 12 via tie rods 14. Thus, rotary motion of the steering wheel 10, i.e., rotary motion of the steering shaft 11 is converted to reciprocating linear motion of the rack shaft 12 in an axial direction (a lateral direction in FIG. 1) via the rack and pinion mechanism 13 that includes the pinion shaft 11c and the rack shaft 12. The reciprocating linear motion is transmitted to the front wheels 15R and 15L via the tie rods 14 that are coupled to different ends of the rack shaft 12. The steered angles of the front wheels 15R and 15L change accordingly.

A motor 40 that is part of the steering assist mechanism is provided near the rack shaft 12 and serves as a source of power (an assist force) supplied to the steering mechanism 2. For example, the motor 40 is a surface permanent magnet synchronous motor (SPMSM) and is a three-phase brushless motor that is rotated on the basis of three-phase (U, V, W) driving electric power. The motor 40 is mounted to the outside of rack housing 16. A ball screw mechanism 20 and a belt speed-reduction mechanism 30 that are part of the steering assist mechanism are provided within the rack housing 16. The ball screw mechanism 20 is integrally mounted around the rack shaft 12. The belt speed-reduction mechanism 30 transmits the rotational force of an output shaft 40a of the motor 40 to the ball screw mechanism 20. The rotational force of the output shaft 40a of the motor 40 is converted, through the belt speed reduction mechanism 30 and the ball screw mechanism 20, to a force that causes the rack shaft 12 to linearly reciprocate in the axial direction. This axial force supplied to the rack shaft 12 changes the steered angles of the right and left steered wheels 15.

As illustrated in FIG. 1, the motor 40 is connected to a steering control unit 50 that controls the driving of the motor 40. The steering control unit 50 controls, on the basis of results detected by various types of sensors, a controlled variable for the motor 40, i.e., the supply of electric current to the motor 40, thereby controlling the driving of the motor 40. Examples of the sensors may include a torque sensor 60, a rotation angle sensor 61, a hub unit sensor 62 (a right front wheel sensor 62R illustrated on the right side of FIG. 1 and a left front wheel sensor 62L illustrated on the left side of FIG. 1). The torque sensor 60 is provided to the pinion shaft 11c. The rotation angle sensor 61 is provided to the motor 40. The left front wheel sensor 62L is provided to a left front hub unit 17L. The right front wheel sensor 62R is provided to a right front hub unit 17R. The torque sensor 60 detects a steering torque Trq that is an operation state quantity generated at the steering shaft 11 and that changes in response to the steering operation performed by a driver. The rotation angle sensor 61 detects a rotation angle θm of the output shaft 40a of the motor 40. The left front wheel sensor 62L detects a wheel speed that is a rotation speed of the left front wheel 15L, and also detects a force applied to the left front wheel 15L, thereby detecting a force generated between a road surface and the left front wheel 15L. The right front wheel sensor 62R detects a wheel speed that is a rotation speed of the right front wheel 15R, and also detects a force applied to the right front wheel 15R, thereby detecting a force generated between the road surface and the right front wheel 15R.

The front wheel sensors 62R and 62L are described in detail below. As illustrated in FIG. 1, the hub unit sensor 62 is incorporated in a hub unit 17. The hub unit 17 is a bearing device and rotatably supports, with respect to a vehicle body, the steered wheel 15 and a drive shaft (not illustrated) that transmits power of an internal-combustion engine mounted on the vehicle. Specifically, the left front wheel sensor 62L is incorporated in the left front hub unit 17L that supports the left front wheel 15L. The right front wheel sensor 62R is incorporated in the right front hub unit 17R that supports the right front wheel 15R. As such, according to the first embodiment, the hub units 17R and 17L are equipped with sensing functions that directly detect the forces applied to the front wheels 15R and 15L, thereby detecting the forces generated between the road surface and the front wheels 15R and 15L.

Figure 2:
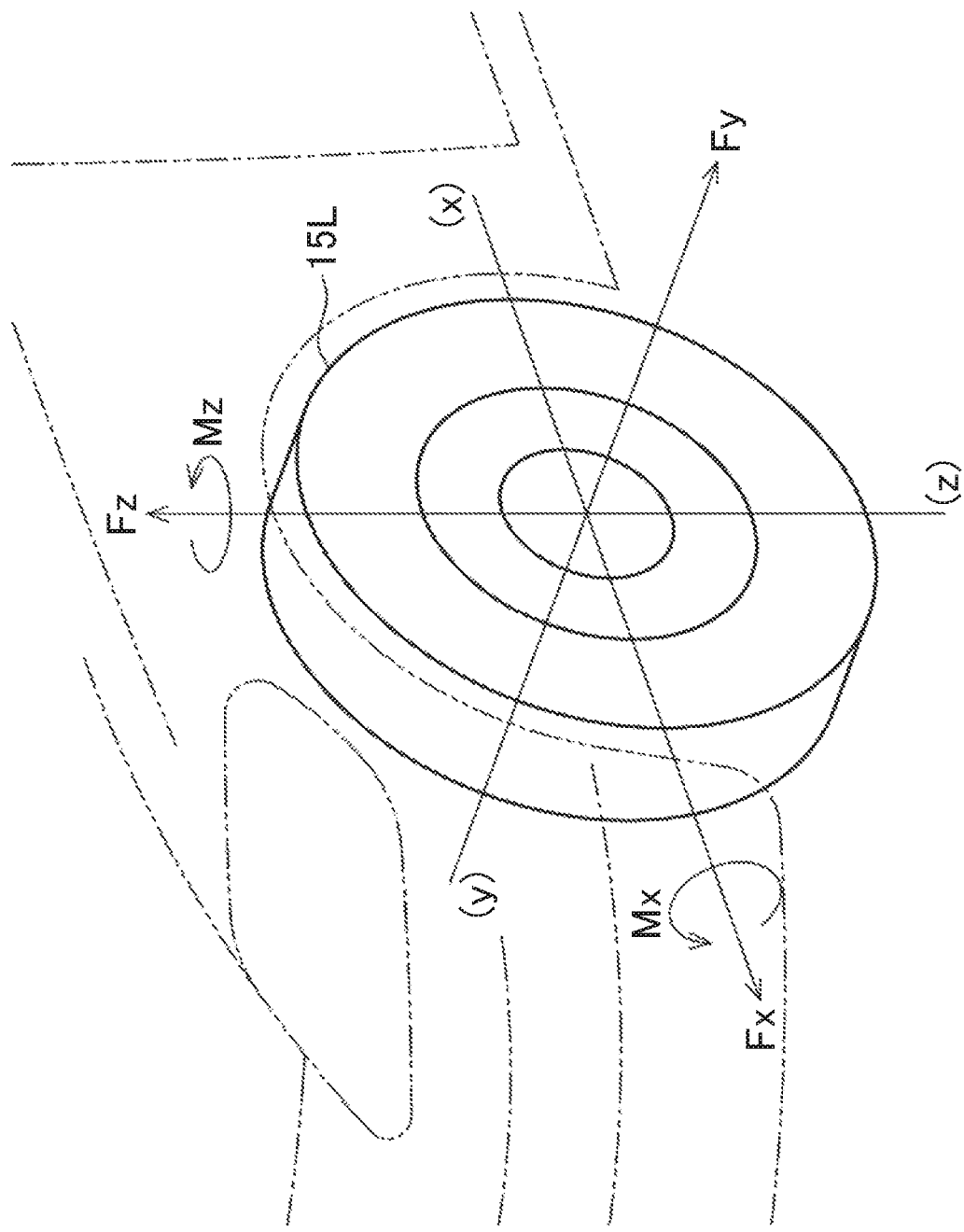
FIG. 2 is a diagram illustrating specifications of a hub unit embodying a bearing device to be mounted on the vehicle.

As illustrated in FIG. 2, for the left front wheel 15L, a longitudinal horizontal direction is defined as the direction of a x-axis, a lateral horizontal direction is defined as the direction of a y-axis, and a vertical direction is defined as the direction of a z-axis. The left front wheel sensor 62L calculates, on the basis of the force applied to the left front wheel 15L, a load Fx in the x-axis direction, a load Fy in the y-axis direction, a load Fz in the z-axis direction, a moment load Mx about the x-axis, and a moment load Mz about the z-axis. The right front wheel sensor 62R performs the same calculation as the left front wheel sensor 62L, on the basis of the force applied to the right front wheel 15R. The loads Fx, Fy, Fz, Mx, and Mz calculated by the front wheel sensor 62L respectively have the same sign as the loads Fx, Fy, Fz, Mx, and Mz calculated by the front wheel sensor 62R. Each of the loads Fx, Fy, Fz, Mx, and Mz (in units of Newton (N)) changes also in accordance with the traveling conditions of the vehicle such as the traveling speed of the vehicle, and is a component including elements such as the traveling speed of the vehicle. In particular, the loads Fz in the z-axis direction change in accordance with a vehicle weight and a load shift. The vehicle weight is the weight of the vehicle including the weight of occupants and baggage in the vehicle. The load shift occurs in the vehicle when the vehicle accelerates or decelerates.

According to the first embodiment, the left front wheel sensor 62L outputs both a left front wheel speed V(L) and a left front vertical force Fz (L) to the steering control unit 50. The left front wheel speed V(L) is detected at the left front wheel 15L. The left front vertical force Fz (L) is information that indicates the load Fz in the z-axis direction detected at the left front wheel 15L. Likewise, the right front wheel sensor 62R outputs both a right front wheel speed V(R) and a right front vertical force Fz (R) to the steering control unit 50. The right front wheel speed V(R) is detected at the right front wheel 15R. The right front vertical force Fz (R) is information that indicates the load Fz in the z-axis direction detected at the right front wheel 15R.

Figure 3:
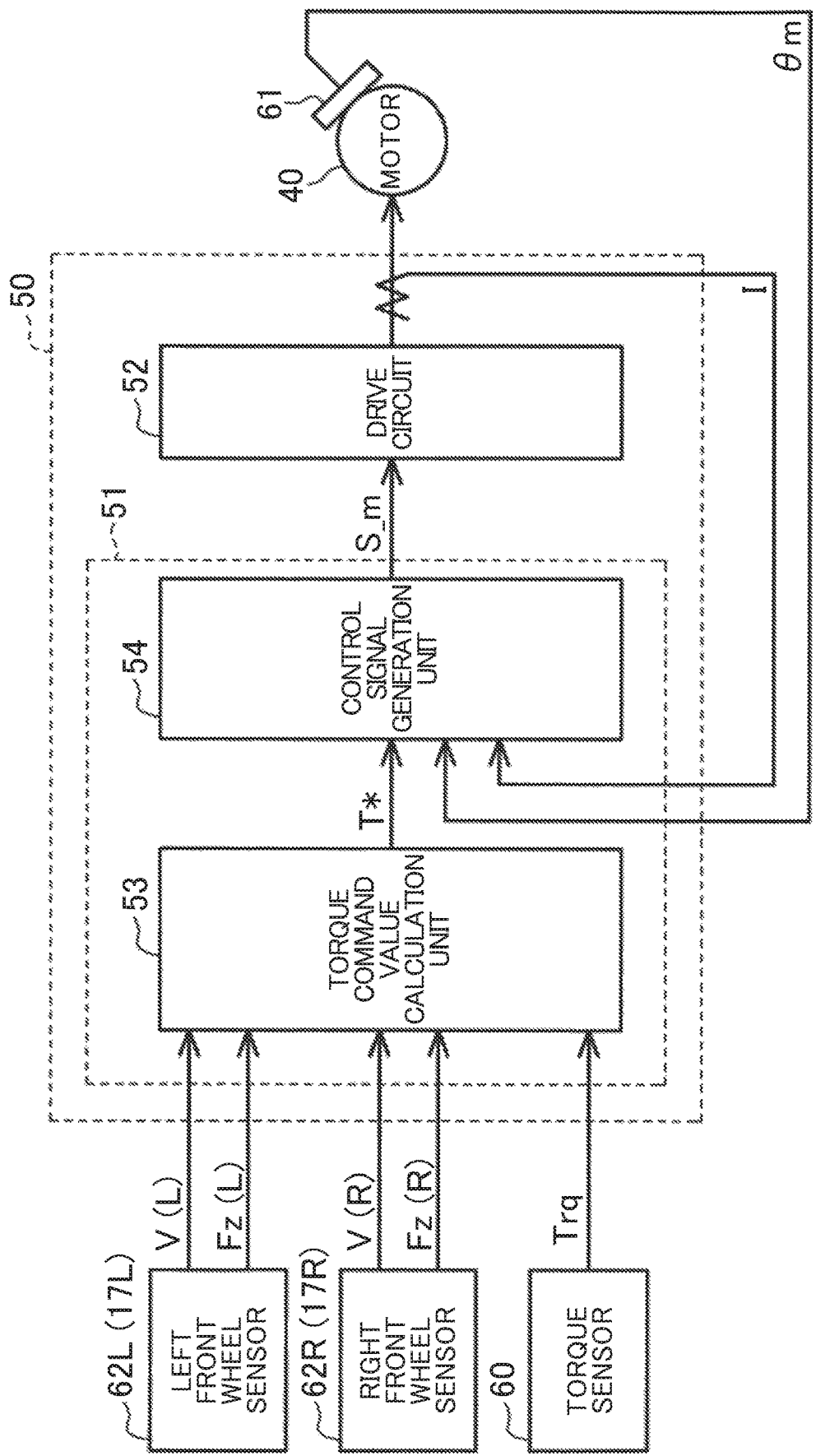
FIG. 3 is a block diagram illustrating the electrical structure of the electric power steering system.

Next, the electrical structure of the electric power steering system 1 is described. As illustrated in FIG. 3, the steering control unit 50 includes a microcomputer 51 and a drive circuit 52. The microcomputer 51 generates a motor control signal S_m. The drive circuit 52 supplies electric current to the motor 40 on the basis of the motor control signal S_m. The microcomputer 51 receives an actual current I through the motor 40 and also receives the results detected by the torque sensor 60, the rotation angle sensor 61, the left front wheel sensor 62L (the left front hub unit 17L), and the right front wheel sensor 62R (the right front hub unit 17R). The microcomputer 51 generates and outputs the motor control signal S_m, in the form of a pulse width modulation (PWM) signal, to the drive circuit 52. According to the first embodiment, the microcomputer 51 is an example of a control unit.

Next, functions of the microcomputer 51 are described in detail. Although not illustrated in the drawings, the microcomputer 51 includes a central processing unit (CPU) and a memory device. The CPU executes a program stored in the memory device, thereby controlling the driving of the motor 40.

FIG. 3 illustrates some processes that are performed by the microcomputer 51. Specifically, in FIG. 3, some processes that are implemented when the CPU executes the program stored in the memory device are illustrated according to types of the processes.

The microcomputer 51 includes a torque command value calculation unit 53 and a control signal generation unit 54. The torque command value calculation unit 53 receives the steering torque Trq, the wheel speeds V(R) and V(L), the vertical forces Fz (R) and Fz (L), and the rotation angle θm. The torque command value calculation unit 53 calculates a torque command value T* on the basis of the steering torque Trq, the wheel speeds V(R) and V(L), the vertical forces Fz (R) and Fz (L), and the rotation angle θm. The torque command value T* is a target value for the amount of electric current corresponding to an assist force that the motor 40 needs to produce.

The control signal generation unit 54 receives the torque command value T* calculated by the torque command value calculation unit 53, the rotation angle θm, and the actual current I. The control signal generation unit 54 generates the motor control signal S_m on the basis of the torque command value T*, the rotation angle θm, and the actual current I, and then outputs the motor control signal S_m, in the form of a PWM signal, to the drive circuit 52.

Figure 4:
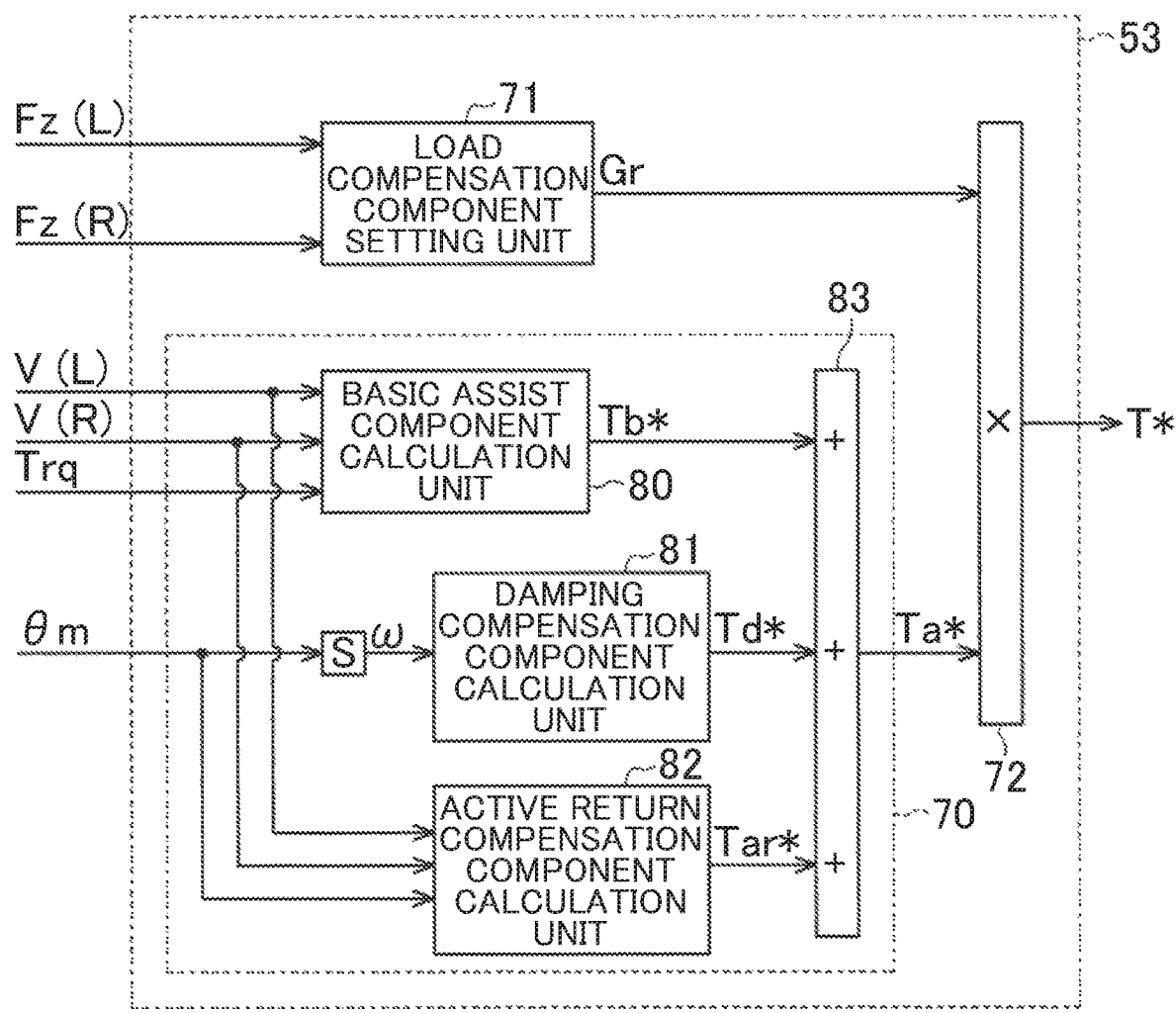
FIG. 4 is a block diagram illustrating the function of a torque command value calculation unit of a steering control unit of the electric power steering system according to a first embodiment.

The function of the torque command value calculation unit 53 is described here in more detail. As illustrated in FIG. 4, the torque command value calculation unit 53 includes an assist component calculation unit 70 and a load compensation component setting unit 71. The assist component calculation unit 70 calculates (generates) an assist component Ta*. The load compensation component setting unit 71 sets (calculates) a compensation gain Gr. The torque command value calculation unit 53 further includes a multiplier unit 72 that multiplies the assist component Ta* generated in the assist component calculation unit 70 by the compensation gain Gr set in the load compensation component setting unit 71, thereby calculating (generating) the torque command value T*.

The assist component calculation unit 70 receives the steering torque Trq, the wheel speeds V(R) and V(L), and the rotation angle θm. On the basis of the steering torque Trq, the wheel speeds V(R) and V(L), and the rotation angle θm, the assist component calculation unit 70 calculates and generates the assist component Ta* indicative of the assist force that the motor 40 needs to produce. The assist component calculation unit 70 uses a predetermined one of the wheel speeds V(R) and V(L) and determines which of the wheel speeds V(R) and V(L) is valid for use, for example, by calculating a root-mean-square sum of each of the wheel speeds V(R) and V(L). In various processing operations, the assist component calculation unit 70 uses a rotational angular velocity ω that is the derivative of the rotation angle θm. Since the rotation angle θm has a correlation with a steering angle θs that is a rotation angle of the steering shaft 11, the steering angle θs is calculable from the rotation angle θm. Thus, since the rotational angular velocity ω has a correlation with a steering velocity ωs that is the rate of change in the steering angle θs of the steering shaft 11, the steering velocity ωs is calculable from the rotational angular velocity ω.

Specifically, the assist component calculation unit 70 includes a basic assist component calculation unit 80 for calculating a basic assist component Tb* that is a basic component of the assist component Ta*. The basic assist component calculation unit 80 calculates the basic assist component Tb* on the basis of the steering torque Trq and the wheel speeds V(R) and V(L). The basic assist component calculation unit 80 calculates the basic assist component Tb* such that the absolute value of the basic assist component Tb* increases with increasing absolute value of the steering torque Trq and increases with decreasing wheel speeds V(R) and V(L).

The assist component calculation unit 70 further includes a damping compensation component calculation unit 81 for calculating a damping compensation component Td* that compensates the basic assist component Tb* to reduce a sudden change (a slight vibration) in the steering angle θs that is the rotation angle of the steering shaft 11. The damping compensation component Td* is one of basic compensation components that compensate the basic assist component Tb* to make the basic assist component Tb* appropriate for the conditions of the vehicle and the steering mechanism 2. The damping compensation component calculation unit 81 calculates the damping compensation component Td* on the basis of the rotational angular velocity ω. The damping compensation component calculation unit 81 calculates the damping compensation component Td*, according to the absolute value of the steering velocity ωs that is obtained by conversion from the rotational angular velocity ω, such that the damping compensation component Td* has a direction opposite to the steering velocity ωs.

The assist component calculation unit 70 further includes an active return compensation component calculation unit 82 that calculates an active return compensation component Tar* that compensates the basic assist component Tb* to return the steering wheel 10 to a neutral position. The active return compensation component Tar* is one of the basic compensation components that compensate the basic assist component Tb* to make the basic assist component Tb* appropriate for the conditions of the vehicle and the steering mechanism 2. The active return compensation component calculation unit 82 calculates the active return compensation component Tar* on the basis of the rotation angle θm and the wheel speeds V(R) and V(L). The active return compensation component calculation unit 82 calculates the active return compensation component Tar* such that as the absolute value of the steering angle θs obtained by conversion from the rotation angle θm increases, a force that returns the steering wheel 10 to the neutral position increases.

The assist component calculation unit 70 further includes an adder unit 83 that calculates (generates) the assist component Ta* by adding together the basic assist component Tb*, the damping compensation component Td*, and the active return compensation component Tar*. As such, the damping compensation component Td* generated by the damping compensation component calculation unit 81 is reflected in the assist component Ta* by being added at the adder unit 83. The active return compensation component Tar* generated by the active return compensation component calculation unit 82 is reflected in the assist component Ta* by being added at the adder unit 83.

The load compensation component setting unit 71 receives the vertical forces Fz (R) and Fz (L). On the basis of the vertical forces Fz (R) and Fz (L), the load compensation component setting unit 71 calculates and sets the compensation gain Gr. The compensation gain Gr is a load compensation component that compensates the assist component Ta* to reduce a change in load on a driver that is caused by a change in the loads Fz on the front wheels 15R and 15L in the z-axis direction (in the vertical direction).

According to the first embodiment, the loads Fz on the front wheels 15R and 15L in the z-axis direction increase as the vehicle weight, including the weight of occupants and baggage in the vehicle, increases. In contrast, the loads Fz on the front wheels 15R and 15L in the z-axis direction decrease as the vehicle weight decreases. When the loads Fz on the front wheels 15R and 15L change in this manner, a frictional force between the road surface and the front wheels 15R and 15L increase or decrease accordingly. The increase or decrease in the frictional force causes a change in load on a driver, such as making a driver feel that it is heavy or light to perform the steering operation. The change in load on a driver is also caused by the load shift that occurs in the vehicle when the vehicle accelerates or decelerates. When the vehicle decelerates, the load shift occurs in a direction toward the front side of the vehicle, so that the loads Fz on the front wheels 15R and 15L in the z-axis direction increase. When the vehicle accelerates, the load shift occurs in a direction toward the rear side of the vehicle, so that the loads Fz on the front wheels 15R and 15L in the z-axis direction decrease. As such, when the vehicle weight changes or when the vehicle accelerates or decelerates, the loads Fz on the front wheels 15R and 15L in the z-axis direction change, thus causing the change in load on a driver. To reduce the change in load on a driver caused by these factors, the load compensation component setting unit 71 detects the loads Fz on the front wheels 15R and 15L in the z-axis direction.

Figure 5:
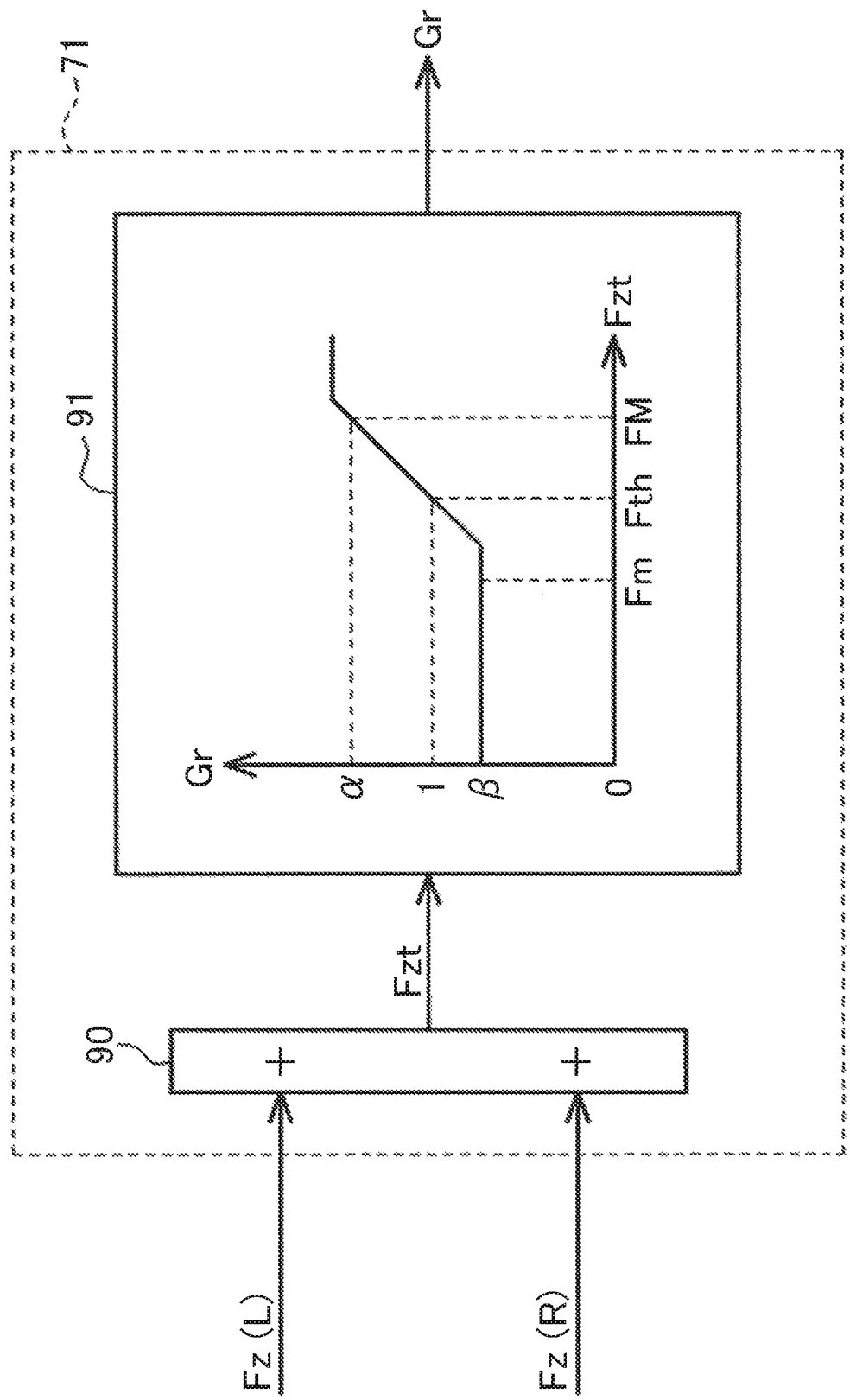
FIG. 5 is a block diagram illustrating the function of a load compensation component setting unit of the torque command value calculation unit.

Specifically, as illustrated in FIG. 5, the load compensation component setting unit 71 includes an adder unit 90 that calculates (generates) a total vertical force Fzt by adding together the left front vertical force Fz (L) and the right front vertical force Fz (R). The left front vertical force Fz (L) is detected as the load Fz on the left front wheel 15L in the z-axis direction. The right front vertical force Fz (R) is detected as the load Fz on the right front wheel 15R in the z-axis direction. Thus, the adder unit 90 calculates the sum of the loads Fz on the front wheels 15R and 15L in the z-axis direction that causes the change in load on a driver.

The load compensation component setting unit 71 further includes a compensation gain calculation unit 91 that calculates, on the basis of the total vertical force Fzt generated by the adder unit 90, the compensation gain Gr that compensates the assist component Ta* to reduce the change in load on a driver. The compensation gain calculation unit 91 calculates and sets the compensation gain Gr, on the basis of the total vertical force Fzt. The compensation gain calculation unit 91 has a map that defines the relationship between the total vertical force Fzt and the compensation gain Gr. The compensation gain calculation unit 91 calculates the compensation gain Gr from the total vertical force Fzt as an input by using the map.

This map is structured such that when the total vertical force Fzt is equal to a predetermined reference value Fth, the compensation gain Gr is set to "1" so that no compensation is needed. The reference value Fth is set to a value in a range that is calculated empirically such that the total vertical force Fzt falls within the range when a vehicle that has a vehicle weight including the weight of one driver of a predetermined reference weight and no baggage is traveling without acceleration or deceleration. According to the first embodiment, setting the compensation gain Gr achieves compensation that maintains, regardless of whether the vehicle weight changes and whether the vehicle accelerates or decelerates, a load on a driver that is expected to be the reference value Fth when the vehicle that has the vehicle weight including the weight of one driver of a predetermined reference weight and no baggage is traveling without acceleration or deceleration.

To achieve such compensation, the compensation gain Gr is set such that as the total vertical force Fzt increases above the reference value Fth, i.e., as the sum of the loads Fz on the front wheels 15R and 15L in the z-axis direction increases above the reference value Fth, the compensation gain Gr increases (becomes greater) within a range that is not less than one. Further, the compensation gain Gr is set such that as the total vertical force Fzt decreases below the reference value Fth, i.e., as the sum of the loads Fz on the front wheels 15R and 15L in the z-axis direction decreases below the reference value Fth, the compensation gain Gr decreases (becomes less) within a range that is less than one.

The map is structured to calculate the compensation gain Gr such that the compensation gain Gr has a linear relationship with change in the total vertical force Fzt, thus increasing or decreasing the assist component Ta* by a percentage of change in the total vertical force Fzt with respect to the reference value Fth. This is because there is a proportional relationship between the following: the loads Fz on the front wheels 15R and 15L in the z-axis direction; the frictional force between the road surface and the front wheels 15R and 15L; and the assist force. Specifically, the percentage of change in the total vertical force Fzt, i.e., a percentage of change in the sum of the loads Fz on the front wheels 15R and 15L in the z-axis direction indicates a percentage of change in the frictional force and a percentage of change in the assist force.

For example, in the map, the compensation gain Gr for when the percentage of change in the total vertical force Fzt with respect to the reference value Fth is an increase of 10% is set to "1.1" on the assumption that the frictional force increases by 10%. This increases the assist component Ta* by 10%, thereby canceling an increase in load on a driver that is caused by the increase in the frictional force. In contrast, the compensation gain Gr for when the percentage of change in the total vertical force Fzt with respect to the reference value Fth is a decrease of 10% is set to "0.9" on the assumption that the frictional force decreases by 10%. This decreases the assist component Ta* by 10%, thereby canceling a decrease in load on a driver that is caused by the decrease in the frictional force.

The map is structured such that the compensation gain Gr for when the total vertical force Fzt has an expected maximum value FM is set to "α" that is less than or equal to the maximum value of the compensation gain Gr. The expected maximum value FM is set to a value in a range that is calculated empirically such that the total vertical force Fzt falls within the range, for example, when the vehicle weight reaches an expected maximum weight. Further, the map is structured such that the compensation gain Gr for when the total vertical force Fzt has an expected minimum value Fm is set to "β" that is greater than or equal to the minimum value of the compensation gain Gr. The expected minimum value Fm is set to a value in a range that is calculated empirically such that the total vertical force Fzt falls within the range, for example, when the vehicle suddenly accelerates.

The compensation gain Gr set by the load compensation component setting unit 71 is reflected in the torque command value T* by being multiplied at the multiplier unit 72. While controlling the driving of the motor 40, the microcomputer 51 repeatedly obtains the vertical forces Fz (R) and Fz (L) at predetermined intervals through the load compensation component setting unit 71. On the basis of the obtained vertical forces Fz (R) and Fz (L), the microcomputer 51 repeatedly generates the compensation gain Gr at predetermined intervals. As such, while controlling the driving of the motor 40, the microcomputer 51 repeatedly performs, at predetermined intervals, processing that reduces a change in load on a driver that is caused by a change in the vehicle weight or caused by acceleration or deceleration of the vehicle.

The effects and advantages of the first embodiment are described below. (1) According to the first embodiment, the vertical forces Fz (R) and Fz (L) are obtained through the microcomputer 51 and the hub units 17R and 17L that respectively rotatably support the front wheels 15R and 15L and that respectively include the front wheel sensors 62R and 62L that respectively detect the forces applied to the front wheels 15R and 15L. The vertical forces Fz (R) and Fz (L) obtained in this manner provide information about the loads Fz on the front wheels 15R and 15L in the z-axis direction that change in accordance with the vehicle weight, including the weight of occupants and baggage in the vehicle, and that change in accordance with the load shift that occurs in the vehicle when the vehicle accelerates or decelerates. Thus, when the frictional force between the road surface and the front wheels 15R and 15L increases or decreases as a result of the change in the loads Fz on the front wheels 15R and 15L in the z-axis direction due to the change in the vehicle weight or due to acceleration or deceleration of the vehicle, a change in load on a driver that is caused by the increase or decrease in the frictional force, such as making a driver feel that it is heavy or light to perform the steering operation, is detectable on the basis of the vertical forces Fz (R) and Fz (L). This enables the microcomputer 51 to compensate the assist component Ta* to reduce the change in load on a driver that is caused by the change in the vehicle weight or caused by acceleration or deceleration of the vehicle, when the microcomputer 51 controls the driving of the motor 40 such that the motor 40 supplies the steering mechanism 2 with power that steers the front wheels 15R and 15L. This provides a driver with a good steering feel.

(2) Specifically, when the total vertical force Fzt that is the sum of the vertical forces Fz (R) and Fz (L) is greater than the reference value Fth, the microcomputer 51 compensates the assist component Ta* such that the assist component Ta* increases. In contrast, when the total vertical force Fzt is less than the reference value Fth, the microcomputer 51 compensates the assist component Ta* such that the assist component Ta* decreases.

Thus, according to the first embodiment, when the load on a driver increases with increases in the loads Fz on the front wheels 15R and 15L in the z-axis direction due to an increase in the vehicle weight or due to deceleration of the vehicle, the assist component Ta* is increased to accommodate a corresponding increase in the frictional force between the road surface and the front wheels 15R and 15L. This reduces the increase, i.e., the change in load on a driver. In contrast, when the loads Fz on the front wheels 15R and 15L in the z-axis direction decrease due to a decrease in the vehicle weight or due to acceleration of the vehicle, the assist component Ta* is decreased to accommodate a corresponding decrease in the frictional force between the road surface and the front wheels 15R and 15L. This reduces the decrease, i.e., the change in load on a driver. Thus, the change in load on a driver that is caused by the change in the vehicle weight or caused by acceleration or deceleration of the vehicle is reduced more appropriately.

(3) The microcomputer 51 includes the load compensation component setting unit 71 that uses the loads Fz on the front wheels 15R and 15L in the z-axis direction, i.e., that uses the total vertical force Fzt in order to set the compensation gain Gr that compensates the assist component Ta* including the components Tb*, Td*, and Tar*.

Thus, according to the first embodiment, optimizing the compensation gain Gr for the assist component Ta* makes it possible to compensate the assist component Ta* more accurately. Although the assist component Ta* includes multiple components, the compensation gain Gr is set collectively for the assist component Ta*, not individually for each of the components included in the assist component Ta*. This feature makes it possible to reduce control changes as much as possible when it is necessary to change characteristics of the compensation gain Gr.

(4) There is a proportional relationship between the following: the loads Fz on the front wheels 15R and 15L in the z-axis direction; the frictional force between the road surface and the front wheels 15R and 15L; and the assist force. For this reason, the compensation gain Gr is calculated in accordance with the percentage of change in the total vertical force Fzt with respect to the predetermined reference value Fth.

This feature makes it possible to calculate the compensation gain Gr in accordance with the percentage of change in the total vertical force Fzt with respect to the reference value Fth at which no compensation is necessary, when calculating the compensation gain Gr to reduce the change in load on a driver that is caused by the change in the vehicle weight or caused by acceleration or deceleration of the vehicle. One advantage of this feature is that the compensation gain Gr is calculable by a simple control structure, such as using a map.

(5) According to the first embodiment, the load compensation component setting unit 71 includes the adder unit 90 that calculates (generates) the total vertical force Fzt by adding together the vertical forces Fz (R) and Fz (L). This feature makes it possible to set (calculate) the compensation gain Gr by using the total vertical force Fzt when the vertical forces Fz (R) and Fz (L) are obtained. Thus, a more appropriate component is set as the compensation gain Gr. This makes it possible to appropriately accommodate the change in load on a driver that is caused by the change in the vehicle weight or caused by acceleration or deceleration of the vehicle, thereby improving a steering feel more effectively.

Next, a steering control unit according to a second embodiment is described. The structures common to the first and second embodiments are denoted by the same reference symbols as those used in the first embodiment, and the already described features of the common structures are not described in the second embodiment.

Figure 6:
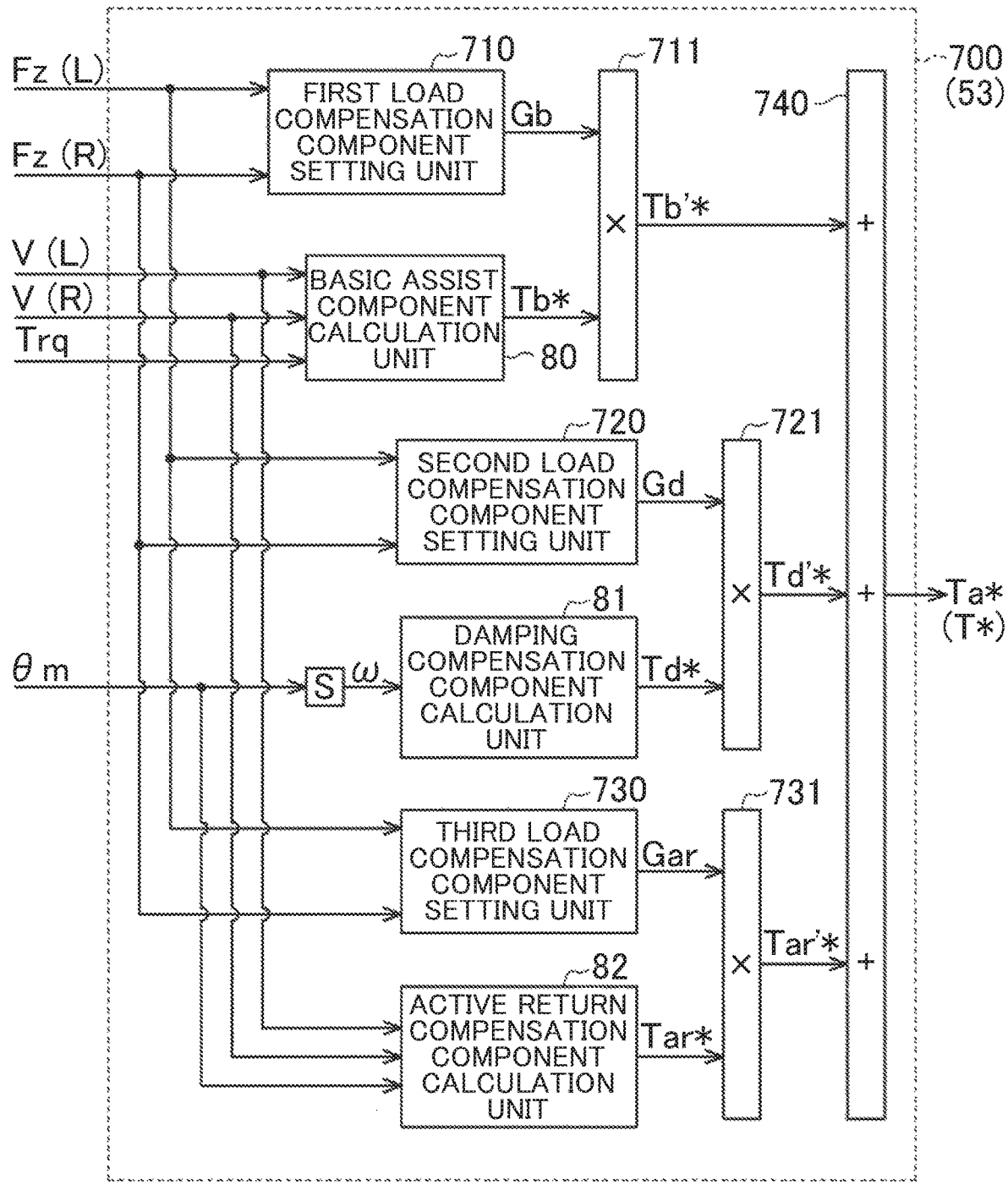
FIG. 6 is a block diagram illustrating the function of a torque command value calculation unit of a steering control unit according to a second embodiment.

The function of a torque command value calculation unit 53 of a steering control unit 50 according to the second embodiment is described in detail below. As illustrated in FIG. 6, according to the second embodiment, an assist component calculation unit 700 of the torque command value calculation unit 53 includes the basic assist component calculation unit 80, the damping compensation component calculation unit 81, and the active return compensation component calculation unit 82. The basic assist component calculation unit 80 calculates the basic assist component Tb*. The damping compensation component calculation unit 81 calculates the damping compensation component Td*. The active return compensation component calculation unit 82 calculates the active return compensation component Tar*. The assist component calculation unit 700 includes load compensation component setting units 710, 720, and 730 that respectively set (calculate) compensation gains Gb, Gd, and Gar that respectively compensate the components Tb*, Td*, and Tar* to reduce a change in load on a driver that is caused by changes in the loads Fz on the front wheels 15R and 15L in the z-axis direction (in the vertical direction).

Specifically, the assist component calculation unit 700 includes a first load compensation component setting unit 710 that sets (calculates) a first compensation gain Gb to compensate the basic assist component Tb* generated by the basic assist component calculation unit 80. The assist component calculation unit 700 further includes a multiplier unit 711 that multiplies the basic assist component Tb* by the first compensation gain Gb set by the first load compensation component setting unit 710, thereby calculating (generating) a post-gain basic assist component Tb'* (=Tb*×Gb).

As with the load compensation component setting unit 71 according to the first embodiment, the first load compensation component setting unit 710 has a first map that defines, on the basis of the vertical forces Fz (R) and Fz (L), the relationship between the total vertical force Fzt and the first compensation gain Gb. The first load compensation component setting unit 710 calculates the first compensation gain Gb from the total vertical force Fzt as an input by using the first map. The first map is structured to calculate the first compensation gain Gb such that the first compensation gain Gb changes linearly with a change in the total vertical force Fzt to increase or decrease the basic assist component Tb* by a predetermined first percentage in accordance with the percentage of change in the total vertical force Fzt with respect to the reference value Fth. The first percentage is empirically predetermined in consideration of influences on the basic assist component Tb*.

The assist component calculation unit 700 includes a second load compensation component setting unit 720 that sets (calculates) a second compensation gain Gd to compensate the damping compensation component Td* generated by the damping compensation component calculation unit 81. The assist component calculation unit 700 further includes a multiplier unit 721 that multiplies the damping compensation component Td* by the second compensation gain Gd set by the second load compensation component setting unit 720, thereby calculating (generating) a post-gain damping compensation component Td'* (=Td*×Gd).

As with the load compensation component setting unit 71 according to the first embodiment, the second load compensation component setting unit 720 has a second map that defines, on the basis of the vertical forces Fz (R) and Fz (L), the relationship between the total vertical force Fzt and the second compensation gain Gd. The second load compensation component setting unit 720 calculates the second compensation gain Gd from the total vertical force Fzt as an input by using the second map. The second map is structured to calculate the second compensation gain Gd such that the second compensation gain Gd changes linearly with the change in the total vertical force Fzt to increase or decrease the damping compensation component Td* by a predetermined second percentage in accordance with the percentage of change in the total vertical force Fzt with respect to the reference value Fth. The second percentage is empirically predetermined in consideration of influences on the damping compensation component Td*.

The assist component calculation unit 700 includes a third load compensation component setting unit 730 that sets (calculates) a third second compensation gain Gar to compensate the active return compensation component Tar* generated by the active return compensation component calculation unit 82. The assist component calculation unit 700 further includes a multiplier unit 731 that multiplies the active return compensation component Tar* by the third compensation gain Gar set by the third load compensation component setting unit 730, thereby calculating (generating) a post-gain active return compensation component Tar'* (=Tar*× Gar).

As with the load compensation component setting unit 71 according to the first embodiment, the third load compensation component setting unit 730 has a third map that defines, on the basis of the vertical forces Fz (R) and Fz (L), the relationship between the total vertical force Fzt and the third compensation gain Gar. The third load compensation component setting unit 730 calculates the third second compensation gain Gar from the total vertical force Fzt as an input by using the third map. The third map is structured to calculate the third second compensation gain Gar such that the third compensation gain Gar changes linearly with the change in the total vertical force Fzt to increase or decrease the active return compensation component Tar* by a predetermined third percentage in accordance with the percentage of change in the total vertical force Fzt with respect to the reference value Fth. The third percentage is empirically predetermined in consideration of influences on the active return compensation component Tar*.

The assist component calculation unit 700 further includes an adder unit 740 that calculates (generates) an assist component Ta* by adding together the post-gain basic assist component Tb'*, the post-gain damping compensation component Td'*, and the post-gain active return compensation component Tar'*. The assist component Ta* generated by the adder unit 740 is used as a torque command value T* according to the second embodiment.

The compensation gains Gb, Gd, and Gar that are respectively set by the load compensation component setting units 710, 720, and 730 are respectively reflected in the components Tb'*, Td'*, and Tar'* by being respectively multiplied at the multiplier units 711, 721, and 731. Further, the components Tb'*, Td'*, and Tar'* are added together at the adder unit 740 so that the compensation gains Gb, Gd, and Gar are reflected in the torque command value T*.

The effects and advantages of the second embodiment are described below. (6) According to the second embodiment, the microcomputer 51 includes the load compensation component setting units 710, 720, and 730 that use the loads Fz on the front wheels 15R and 15L in the z-axis direction, i.e., the total vertical force Fzt, in order to respectively set the compensation gains Gb, Gd, and Gar that respectively compensate the components Tb*, Td*, and Tar*.

Thus, according to the second embodiment, although the assist component Ta* includes a variety of components Tb*, Td*, and Tar*, the compensation gains Gb, Gd, and Gar are settable respectively for the components Tb*, Td*, and Tar* in consideration of influences on the components Tb*, Td*, and Tar*. This feature makes it possible to individually set the compensation gains Gb, Gd, and Gar appropriately to accommodate the change in load on a driver that is caused by the change in the vehicle weight or caused by acceleration or deceleration of the vehicle. Thus, the change in load on a driver that is caused by the change in the vehicle weight or caused by acceleration or deceleration of the vehicle is reduced appropriately.

The embodiments described above may be modified in various ways, for example, as follows. In the first embodiment, the map of the compensation gain calculation unit 91 may be structured to calculate the compensation gain Gr such that the compensation gain Gr changes non-linearly with respect to the change in the total vertical force Fzt. In this case, a range around the reference value Fth (e.g., a range where the percentage of change in the total vertical force Fzt is a few percent or less) may be set as a dead range where the compensation gain Gr is maintained at "1", or a range where the compensation gain Gr changes with a smaller gradient than in other ranges may be set. This modification is applicable also to the second embodiment, and the compensation gains Gb, Gd, and Gar may be calculated such that the compensation gains Gb, Gd, and Gar change non-linearly with respect to the change in the total vertical force Fzt.

In the first embodiment, the compensation gain calculation unit 91 may set the compensation gain Gr by using a function (a mathematical equation such as a formula) instead of a map. This modification is applicable also to the second embodiment.

In the first embodiment, the load compensation component setting unit 71 may use a map to calculate and set, on the basis of the total vertical force Fzt, a component (a controlled variable) to be added to or subtracted from the assist component Ta*. In this case, the torque command value calculation unit 53 includes an adder unit (or a subtractor unit), instead of the multiplier unit 72, that calculates (generates) the torque command value T* by adding (subtracting) the component set by the load compensation component setting unit 71 to (from) the assist component Ta*. The load compensation component setting units 710, 720, and 730 according to the second embodiment may be modified in the same manner as the load compensation component setting unit 71.

In the first embodiment, the adder unit 90 may be eliminated so that the compensation gain Gr is set (calculated) on the basis of each of the vertical forces Fz (R) and Fz (L). This modification achieves the same advantages as the first embodiment. This modification is applicable also to the load compensation component setting units 710, 720, and 730 according to the second embodiment.

In the first embodiment, the assist component calculation unit 70 needs to include at least the basic assist component calculation unit 80. Thus, the damping compensation component calculation unit 81 and the active return compensation component calculation unit 82 for calculating the basic compensation components may be eliminated from the assist component calculation unit 70, or additional calculation units for calculating other basic compensation components may be added to the assist component calculation unit 70. Examples of the other basic compensation components may include a torque derivative compensation component and an inertia compensation component. The torque derivative compensation component is used to suppress reverse input vibrations that are transmitted to the steering shaft 11 from the road surface through the front wheels 15R and 15L. The inertia compensation component is used to reduce a drag feel that is caused when the steering wheel 10 starts to be turned, and a slip feel that is caused when the steering wheel 10 finishes being turned. The torque derivative compensation component is calculated on the basis of a torque derivative that is obtained by differentiating the steering torque Trq. The inertia compensation component is calculated on the basis of a rotational angular acceleration that is obtained by differentiating the rotational angular velocity $\omega$, i.e., calculated on the basis of a steering acceleration that is obtained by differentiating the steering velocity $\omega s$. This modification is applicable also to the second embodiment. When this modification is applied to the second embodiment, compensation gains are set according to types of calculation units that calculate basic compensation components.

Although the second embodiment illustrates that a compensation gain is set individually for each of the components Tb*, Td*, and Tar* that are included in the assist component Ta*, the compensation gain may be set for at least one of the components Tb*, Td*, and Tar*. For example, a compensation gain may be set for each of the basic assist component Tb* and the damping compensation component Td*, while no compensation gain may be set for the active return compensation component Tar*. As for the damping compensation component Td* and the active return compensation component Tar* that are the basic compensation components, a compensation gain may be set for a total basic compensation component that is the sum of the damping compensation component Td* and the active return compensation component Tar*.

In the embodiments, only when the total vertical force Fzt is greater than the reference value Fth, the assist component Ta* may be compensated such that the assist component Ta* increases, i.e., when the total vertical force Fzt is less than the reference value Fth, the assist component Ta* may not be compensated. In contrast to this, only when the total vertical force Fzt is less than the reference value Fth, the assist component Ta* may be compensated such that the assist component Ta* decreases.

In the embodiments, the reference value Fth may be changed appropriately to accommodate vehicle specifications or vehicle use environments. For example, for vehicles that are mainly used to carry baggage, the reference value Fth may be set on the basis of the assumption that the vehicle carries some baggage.

In the embodiments, the hub units 17R and 17L are required to output at least the vertical forces Fz (R) and Fz (L) on the basis of forces applied to the front wheels 15R and 15L. The front wheel sensors 62R and 62L of the hub units 17R and 17L may be any type of sensor that satisfies this requirement, such as an ultrasonic type sensor, a magnetic type sensor, or a contact type sensor with a strain gauge.

In the embodiments, the basic assist component calculation unit 80 uses at least the steering torque Trq to calculate the basic assist component Tb*. Thus, the basic assist component calculation unit 80 may use only the steering torque Trq, without using the wheel speeds V(R) and V(L), to calculate the basic assist component Tb*. Alternatively, the basic assist component Tb* may be calculated on the basis of the steering torque Trq, the wheel speeds V(R) and V(L), and other suitable elements. Likewise, the damping compensation component calculation unit 81 uses at least the rotational angular velocity $\omega$ to calculate the damping compensation component Td*. Thus, the wheel speeds V(R) and V(L) as well as other elements, in addition to the rotational angular velocity $\omega$ may be used to calculate the damping compensation component Td*. Likewise, the active return compensation component calculation unit 82 uses at least the rotation angle $\theta m$ to calculate the active return compensation component Tar*. Thus, the active return compensation component Tar* may be calculated on the basis of only the rotation angle $\theta m$, without using the wheel speeds V(R) and V(L), or may be calculated on the basis of the rotation angle $\theta m$, the wheel speeds V(R) and V(L), and other suitable elements.

In the embodiments, if the vehicle is equipped with a steering angle sensor for detecting the steering angle $\theta s$ that changes with rotation of the steering shaft 11, the compensation component calculation units 81 and 82 may calculate the compensation components Td* and Tar* by using the steering angle $\theta s$ that is detected by the steering angle sensor, or by using the steering angular velocity $\omega s$ that is obtained by differentiating the steering angle $\theta s$.

In the embodiments, the electric power steering system 1 is a rack assist type in which the output shaft 40a of the motor 40 that supplies the steering mechanism 2 with the assist force is disposed parallel to the axis of the rack shaft 12. Alternatively, the electric power steering system 1 may be a column type, a pinion type, or any other suitable type of electric power steering system.

The modifications described above may be combined in various way. For example, the modification where the compensation components Td* and Tar* are calculated by using the detection result of the steering angle sensor that detects the steering angle θs that changes with rotation of the steering shaft 11 may be combined with any of the other modifications.

The invention makes it possible to reduce a change in load on a driver.

What is claimed is:

1. A steering control unit comprising:
a control unit that controls driving of a motor in response to a steering operation that a driver performs to operate a steering mechanism of a vehicle, the motor being a source of an assist force supplied to the steering mechanism, wherein the control unit is configured to
obtain a vertical force that is information about a vertical load on a steered wheel of the vehicle, the vertical load being obtained by a bearing device that rotatably supports the steered wheel and that has a sensor for detecting a force applied to the steered wheel,
calculate a torque command value that is a target for the assist force of the motor, the torque command including a multiplication of an assist component and a load compensation component,
calculate the load compensation component in accordance with the vertical load, and
calculate the assist component, wherein
the assist force reduces the change in load on the driver that is caused when the vertical load on the steered wheel changes,
the load compensation component is a compensation gain that has a linear relationship with change in the vertical force,
the compensation gain is calculated in accordance with a percentage of change in the vertical force with respect to a predetermined reference value, and
the reference value is predetermined such that when the vertical force is equal to the reference value, it is not necessary to make compensation that reduces the change in load on the driver that is caused when the vertical load on the steered wheel changes.

2. The steering control unit according to claim 1, wherein
when the vertical force has a predetermined first value that indicates an increase in the vertical load, the control unit compensates the assist component such that the assist component increases, and
when the vertical force has a predetermined second value that indicates a decrease in the vertical load, the control unit compensates the assist component such that the assist component decreases.

3. The steering control unit according to claim 1, wherein
the assist component includes a basic assist component and a basic compensation component,
the basic assist component is a basic component of the assist force,
the basic compensation component compensates the basic assist component to make the basic assist component appropriate for conditions of the vehicle and the steering mechanism,
the control unit calculates the assist component by adding together a plurality of components including the basic assist component and the basic compensation component, and
the control unit calculates the load compensation component to reduce the change in load on the driver that is caused when the vertical load on the steered wheel changes.

4. The steering control unit according to claim 1, wherein
the steered wheel includes right and left steered wheels of the vehicle,
the control unit includes an adder that calculates a total vertical force by adding together the vertical forces on the right and left steered wheels, and
the control unit sets the load compensation component by using the total vertical force.

5. A steering control unit comprising;
a control unit that controls driving of a motor on a basis of an operation state quantity that changes in response to a steering operation that a driver performs to operate a steering mechanism of a vehicle, the motor being a source of an assist force supplied to the steering mechanism, wherein the control unit is configured to
obtain a vertical force that is information about a vertical load on a steered wheel of the vehicle, the vertical load being obtained by a bearing device that rotatably supports the steered wheel and that has a sensor for detecting a force applied to the steered wheel,
calculate a torque command value that is a target for the assist force of the motor, the torque command including a combination of a basic assist component, a basic compensation component, and a load compensation component,
calculate the basic assist component,
calculate the basic compensation component using values appropriate for conditions of the vehicle and the steering mechanism, and
calculate the load compensation component to reduce a change in load on the driver that is caused when the vertical load on the steered wheel changes, wherein
the load compensation component is a compensation gain that has a linear relationship with change in the vertical force,
the compensation gain is calculated in accordance with a percentage of change in the vertical force with respect to a predetermined reference value, and
the reference value is predetermined such that when the vertical force is equal to the reference value, it is not necessary to make compensation that reduces the change in load on the driver that is caused when the vertical load on the steered wheel changes.

6. The steering control unit of claim 5, wherein the basic assist component is calculated based on steering torque and wheel speed.

7. The steering control unit of claim 6, wherein the basic compensation component includes a damping compensation component that varies opposite to steering velocity, and includes an active return compensation component that increases as steering angle increases.

8. The steering control unit of claim 5, wherein an absolute value of the basic assist increases with increasing absolute value of steering torque.

9. The steering control unit of claim 8, wherein an absolute value of the basic assist increases with decreasing wheel speed.

10. The steering control unit of claim 5, wherein the basic compensation component includes a damping compensation component that varies opposite to steering velocity, and includes an active return compensation component that increases as steering angle increases.

* * * * *